United States Patent
Rhyne et al.

(10) Patent No.: US 7,305,182 B1
(45) Date of Patent: Dec. 4, 2007

(54) PROCESS FOR PROVIDING EVENT PHOTOGRAPHS OF AN EVENT FOR INSPECTION SELECTION AND DISTRIBUTION

(75) Inventors: Bruce Lane Rhyne, Cedar Park, TX (US); Prentiss Lee Rhyne, Levelland, TX (US)

(73) Assignee: My Photo Paradise, LLC, Cedar Park, TX (US)

( * ) Notice: Subject to any disclaimer, the term of this patent is extended or adjusted under 35 U.S.C. 154(b) by 0 days.

(21) Appl. No.: 11/504,265

(22) Filed: Aug. 15, 2006

(51) Int. Cl.
*G03B 17/48* (2006.01)
*H04N 5/225* (2006.01)
*G06Q 30/00* (2006.01)
*G06K 15/12* (2006.01)

(52) U.S. Cl. .................. 396/429; 348/207.1; 358/1.15; 705/1; 705/26

(58) Field of Classification Search ................ 396/429; 348/207.1; 705/27
See application file for complete search history.

(56) References Cited

U.S. PATENT DOCUMENTS

| 6,915,273 B1 * | 7/2005 | Parulski .................. 705/26 |
|---|---|---|
| 6,965,447 B2 * | 11/2005 | Satake et al. .............. 358/1.15 |
| 2002/0143649 A1 * | 10/2002 | Wise ........................... 705/26 |
| 2002/0147661 A1 * | 10/2002 | Hatakama et al. ............ 705/26 |
| 2004/0135888 A1 * | 7/2004 | Oakeson et al. ......... 348/207.1 |
| 2004/0148231 A1 * | 7/2004 | Ximenes et al. .............. 705/26 |
| 2004/0215523 A1 * | 10/2004 | Wulff et al. ................... 705/26 |
| 2004/0260614 A1 * | 12/2004 | Taratino et al. ............... 705/26 |
| 2004/0263631 A1 * | 12/2004 | Brittan et al. ............ 348/207.1 |
| 2006/0056832 A1 * | 3/2006 | Yamaguchi et al. .......... 396/56 |
| 2006/0155612 A1 * | 7/2006 | Haeberli ...................... 705/26 |
| 2006/0287930 A1 * | 12/2006 | Wolf et al. ................... 705/26 |

* cited by examiner

*Primary Examiner*—W. B. Perkey
(74) *Attorney, Agent, or Firm*—Buskop Law Group, PC; Wendy Buskop

(57) ABSTRACT

The embodiments generally relate to a process of providing event photographs of a event for inspection, selection and distribution via a web accessible computer network. At the event a photographer takes photographs of the event and the event participants. At the end of the event notification is provided to the participants of the event of the opportunity to download at least one copy of the photographs at no charge.

27 Claims, No Drawings

PROCESS FOR PROVIDING EVENT PHOTOGRAPHS OF AN EVENT FOR INSPECTION SELECTION AND DISTRIBUTION

FIELD

The present embodiments generally relate to a method for photographing events which can be used to increase media promotion and control terrorism.

BACKGROUND

A need exists for the media and for terrorist control organizations to have faster access to photographs of participants at public events than currently possible. There is a need for high definition pictures of individuals that support Al Queda and other devious groups at public events.

A need exists for participants at event functions to collect images of each other, particularly for networking purposes so a face and a name can be put together more rapidly.

A need exists for a less expensive method of getting photographs to event participants in a controlled and secured manner.

A need exists for sponsors to promote their organizations with information on the borders surrounding the photographs.

The present embodiments meet these needs.

DETAILED DESCRIPTION OF THE EMBODIMENTS

Before explaining the present embodiments in detail, it is to be understood that the embodiments are not limited to the particular embodiments and that the invention can be practiced or carried out in various ways.

The embodiments are for a method or process for providing event photographs, such as of an honoree, or of attendees, of a event, such as a Gala, for inspection of photographs, selection of photographs and distribution electronically of photographs using a web accessible computer network.

The method has the benefit that event participants can receive photographs taken at the event at a greatly reduced price or even free, which traditionally has been a very expensive service in the past.

One of the benefits of this process is that friends and relatives of event participants can also receive copies of these photographs for free or at a greatly reduced cost in view of the traditional cost for reprints, such as from traditional event photographers.

This method enables an event participant to a higher quality and timely recorded medium of events in which they participate for purposes of documentation of claims for tax benefit with the IRS. This method provides proof of attendance in order to be ensured of taking a tax deduction, should paperwork to the event otherwise become lost.

Still another benefit of this method is that an event photographer can create and receive a higher revenue stream, potentially per event, by use of this method.

The method or process involves a series of steps, the first step is creating a sponsorship service for an event by hiring a photographer.

The photographer can be an individual, an association of individuals or a company which provides photographic services.

The photographer performs a group of steps, namely, the photographer first takes photographs of event participants. This step has the photographer providing on location shooting of event participants, and generating photographs of those event participants on a real time basis.

Next, the photographer creates an event template including photo-borders for the photos on a relational database in communication with the web accessible computer network. Then the photographer associates identifying data with each event template and the identifying data includes an event name, such as the American Heart Association New Years Eve Gala, 2006, and one or more related pieces of data such as the name of the participating organization, such as the American Heart Association, an event location, such as the Omni Hotel in Austin, Tex., an event date such as Jan. 1, 2006, and/or an event time, such as 11 pm-2 am.

The photographer transfers the photographs of event participants to the event templates wirelessly while taking the photographs or after taking the photographs through the use of a computer. Wirelessly, this can be done by using a digital camera, such as by Canon, which is wirelessly connected to the internet, and then after taking a single or group of photographs for an event participant, saving those photographs and transmitting them over the internet to a web accessible server with a database designed to provide users the ability to view and obtain those photographs.

Either automatically, or by coding with a set or defined codes, the photographer then catalogs the event templates in the dynamic relational searchable database on the web accessible server using identifying data from the event.

Next, the photographer inserts sponsor data on at least one of the borders of each photograph. Alternately, the photographer can place a watermark on the photograph or the border and the watermark can be placed on the photographs. The data can include a sponsor name, a website link, a hyperlink to a non-sponsor website, information about a new featured product of the sponsor, additional information on the sponsor's next event or any other data the sponsor desires to promote.

By transmission, which can be by email, a Blackberry™, or other electronic notification system to a cell phone, pager, or normal email, the photographer, during the event and again after the event advises event participants of the opportunity to download copies of the photographs with sponsor data at no charge for as long as the photographs are made available on the server. The same notification system can advise sponsors of the availability of the photographs to view. The free copies are a tremendous savings over traditional event photography charges. An example are cruise ship photos. If this system was used with cruise ships, then the $20 fee for each photograph would be replaced with the sponsor information on the photograph, and the cruisers could then email lots of copies of them having fun on the cruise to lots of other people, generating sales for the cruise line through visual display of photos featuring their cruises and their ships. Carnival charges $20 per 8×10 photo taken on the cruise as does Royal Caribbean, and accordingly only a few photos are purchased per cruise, none acting as a marketing tool for the cruise line. With this method, the cruise lines would have a terrific marketing tool, paid by the sponsors such as the companies that do the shore excursions.

The photographer then provides an email or other electronic notification device to event participants, sponsors, or both, that the photographs are ready to view while also providing identifying data to event participants, sponsors, or both with instructions on how to locate a particular event template.

The process further includes the step of providing sponsorship service simultaneously for multiple associations, businesses, educational institutions and individuals for the event simultaneously or provides the service in series.

The process can include providing notification to the event participants of the opportunity to download at least one copy of the photographs at no charge.

The process contemplates paying photographer using (i) a flat fee for the event; (ii) an hourly rate based on event duration; (iii) an hourly rate based on attendance duration of the photographer; (iv) a fee based on number of event participants present, or (v) a fee based on each photograph taken during the event. For example, the fees could be $750 for the entire event, $250 an hour per photographer up to a defined max of $750 US Dollars, $2.00 per participant, or a fee based on a batch number, or 250 photos at $3.00 each for a fee of $750.00.

A further benefit of this process is that each sponsor has a unique advertising medium not available previously, by which they can reach a specific highly targeted audience with a highly desirable service that is provided to their customers or sponsored audience for a greatly reduced price or for free. By the very nature of event photographs service, they are reaching the exact audience the sponsor desires.

The process further contemplates that the sponsor can be a restaurant or a sports bar.

The process also contemplates that a feedback feature, such as a follow-up survey could be used with event participants. The feedback feature would enable sponsors to receive feedback from those who attended the sponsored event as well as from others which are invited by attendees to visit and view the event photographs. The feedback could be regarding the event, the event location, the event sponsor or sponsors, or the event photography service itself. In return for providing feedback, the participants in the feedback survey could be entered into a monthly, weekly or bimonthly drawing for a prize or some other benefits, such as tickets to the next Association gala.

It is contemplated that this event feedback could be provided to event sponsors enabling them to determine how efficient, effective and targeted their sponsorship was during the event. The embodiments provide sponsors with a feedback system that generates greater customer participation than feedback systems that have been previously utilized.

The method is easy to use and provides detailed demographic data, generally not available to the sponsors, as sponsors can obtain data regarding all visitors to a site they are sponsoring The embodiment accomplishes this additional feature by having all visitors, or event participants create a unique log in identification, such as Bruce.Rhyne and a password TURBODOG prior to obtaining access to the events hosted on the site of the event photographic service. The site then can track which events are visited by which visitors and delivers resulting data to appropriate sponsors which have indicated they which to have this tracked data forwarded to them.

For example, the embodiments can be used when a corporation, such as Big Green Earth, Inc. desires to be a sponsor of a conference attended by 500 sales representatives for recycled paper products for the State of Texas, that is a given geographical region. More than one state could be in a given geographical region. The sponsor, Big Green Earth, Inc. desires to hold a 2 hour reception for the sales representatives present and greet each one, and encourage them to greet each other. A perk or benefit for the sales representatives would be that Big Green Earth, Inc., the sponsor, could provide an event photographer, who takes 250 photos so that when the sales representatives return home, they could access the server to download and save the event photographs as a memory of the event, and enable them to remember the other representatives, in case there is a synergy, and increased business could result. The event photographer could be an employee of Big Green Earth, Inc, or could be an outside service provider which charges for the services based on several parameters, namely, a lump sum of $750.00 for the cocktail party, a fee of $250.00 per hour for as long as the cocktail reception occurs, a fee per participant, such as $2.00 per participant for a total of $1000.00 given all participants attending, or a fee per photograph, such as $3.00 per photographs to a max of $750.00 photographs.

The sponsor can use an employee of the sponsor or a third party to display the photographs during and after the event. The photographer can be a photography service comprising multiple photographers.

The event can be a private event or a public event. Types of events for which these embodiments are contemplated include: a fraternity event such as a frat fund raiser for a scholarship fund, a sorority event to raise money for a pregnant sorority sister, a charity event, such as a theater company needing donors of $1000.00 or more, a corporate event such as successful sale of a division, a graduation event such as graduation from a vocational school, a sporting event such as a little league championship playoff, a wedding, a bar mitzvah, a quinceaneras, a dance such as a prom, a business meeting such as a team building meeting for an international sales force, a family reunion, a class reunion, or a religious function such as a Christening party for a baby.

The event can be a concert, a holiday celebration, like a company Christmas party, a restaurant having a special music event, a school event like a large musical production, a homecoming festivity, an industry trade show such as the annual meeting of the Instrument Society of America or a product show like the Houston Car Show which happens every year.

It is contemplated that the photographs can be digital images or an enhanced digital image.

The embodiments can include conventional photographs, such as conventional black and white or color photographs, that are scanned into an electronic file.

A further embodiment can contemplate that all steps of the process are completed during the event, and the event participants can view the photographs while the event is ongoing.

In still another embodiment the process can contemplate continuously updating the process during the event.

Earlier, it was noted that a notification system is used to advise event participants that photographs were ready for viewing, in an embodiment, this notification system can be an automatic notification system operating and transmitting once the photograph is cataloged.

An embodiment contemplates that the photographs of public events can be made accessible to the media for use in news story reporting.

Another embodiment contemplates that the photographs at public events can be made accessible to the FBI, CIA, TSA and Homeland Security for controlling terrorist activity.

Yet another embodiment contemplates using a user ID and password, or other security feature installed on the server. Parties desiring downloading of the photographs must have a security clearance for access to the photographs, that is the user ID and password to access the photographs. The security feature could be a single password usable by all event participants and sponsors, or the security feature could control access enabling only individual event participants to view photographs taken of them. The security feature could be a single password used to gain access to photographs of all events of an association or a sponsor.

It is contemplated that the photographs can be displayed on the server in the resolution in which they were originally generated and saved, or in a resolution reduced from the original resolutions. The photographs can also be shown in a group of thumbnail photographs. Alternatively, the photos could be viewed in a low resolution, small format, and then when clicked on, transforming to the higher resolution for better viewing.

Still another embodiment envisions the additional feature termed "send this photo to a friend". This feature contemplates that a viewer could locate a particular photograph in the database and by using a "send this photo to a friend feature", they could generate and send an email containing a link back to the specific photo or specific event, to an email address or list of email addresses provided by the viewer. This feature could be date limited or copy limited.

In an embodiment, it is contemplated that the server is controlled by the sponsor and the event participant must click through the sponsor's home page prior to view the photographs. The sponsor can in fact, be one or more event participants.

It is also contemplated that the photographer is adapted to take orders for quantities of photographs greater than 1 by the photographer, and the photographer fulfilling the orders.

To maximize benefits to the sponsor, an embodiment contemplates installing an interactive product/service web page containing products of the photographer on the web server and requiring web participants to click through the interactive product/service web page prior to accessing the photographs and ordering products from the photographer if desired from the interactive product/service web page.

To maximize benefit to the photographer, an embodiment contemplates installing an interactive product web page on the web server, and requiring event participants to click through the interactive product web page prior to accessing the photographs, and ordering products of the photographer if desired from the interactive product web page.

The embodiments have been described in detail with particular reference to certain embodiments, thereof, but it will be understood that variations and modifications can be effected within the scope of the embodiments, especially to those skilled in the art.

What is claimed is:

1. A process for providing event photographs of a event for inspection, selection and distribution via a web accessible computer network, comprising the steps of:
    a. creating a sponsorship service for an event by hiring a photographer, wherein the photographer performs the steps comprising:
        i. taking photographs of event participants;
        ii. creating an event template including photo borders for the photographs on a relational database in communication with the web accessible computer network and associating identifying data with each event template wherein the identifying data corresponds to an event name, and a member of the group comprising: a name of a participating organization, an event location, an event date, an event time; or combinations thereof;
        iii. transferring the photographs of event participants to the event templates;
        iv. inserting sponsor data on at least one borders of each photograph, on each photograph using a watermark, or using a watermark and at least one border of each photograph;
        v. providing identifying data to event participants, sponsors, and combinations thereof, with instructions on how to locate a particular event template; and
        vi. providing notification to the event participants of the opportunity to download at least one copy of the photographs at no charge;
    b. providing the sponsorship service simultaneously for members of the group: associations, organizations, businesses, individuals, educational institutions and combinations thereof; and
    c. paying the photographer by the sponsor using a fee selected from the group comprising: (i) a flat fee for the event; (ii) an hourly rate based on event duration; (iii) an hourly rate based on attendance duration of the photographer, (iv) a fee based on number of event participants present, or (v) a fee based on each photograph taken during the event.

2. The process of claim 1, wherein the sponsor uses an employee of the sponsor to create the photos and a third party to display the photos.

3. The process of claim 1, wherein the photographer is a photography service.

4. The process of claim 1, wherein the event is a private event.

5. The process of claim 4, wherein the private event is selected from the group comprising: a fraternity event, a sorority event, a charity event, a corporate event, a graduation event, a sporting event, a wedding, a bar mitzvah, a quinceaneras, a dance, a business meeting, a family reunion, a class reunion, or a religious function.

6. The process of claim 1, wherein the event is a concert, a holiday celebration, a restaurant, sports bar, a school event, a homecoming festivity, an industry trade show, a product show, or combinations thereof.

7. The process of claim 1, wherein the photograph is a digital image, a conventional color image, a black and white image, or an enhanced digital image, or combinations thereof.

8. The process of claim 1, wherein all steps of the process are completed during the event, and the event participants can view the photographs while the event is ongoing.

9. The process of claim 1, wherein the process is a continuously updated process during the event.

10. The process of claim 1, wherein the notification system is an automatic notification system that transmits automatically once an event is cataloged.

11. The process of claim 1, wherein the photographs are of public events and are made accessible to the media.

12. The process of claim 1, wherein the photographs are of public events and are made accessible to the FBI, CIA, TSA and Homeland Security for controlling terrorist activity.

13. The process of claim 1, wherein event participants must provide registration data, wherein the registration data comprises: a member selected from the group: a user's name, a user's address, a user's email address, a user's age, a user's gender, and combinations thereof, prior to being allowed to viewing the photographs.

14. The process of claim 13, wherein the registration data is provided to sponsors of the events.

15. The process of claim 1, wherein a security feature is installed on the server and parties desiring downloading of the photographs must have a security clearance for access to the photographs.

16. The process of claim 15, wherein the security feature is a single password usable by all event participants, and sponsors.

17. The process of claim 15, wherein the security feature enables only event participants to view photographs from the event.

18. The process of claim 15, wherein the security feature is a single password used to gain access to photographs of all events of a sponsor.

19. The process of claim 1, wherein the photographs are displayed on the server in the resolution in which they were originally generated and saved, or in a resolution reduced from the original resolution.

20. The process of claim 1, further comprising a "send this photo to a friend" feature.

21. The process of claim 1, wherein the event participant must click through information provided by the sponsor prior to viewing the photographs.

22. The process of claim 1, wherein the sponsor are one or more event participants.

23. The process of claim 1, further comprising the step of the photographer taking orders for quantities of photographs and other related products, and the photographer fulfilling the orders.

24. The process of claim 1, further comprising the step of installing an interactive product web page on the web server, and requiring event participants to click through the interactive product web page prior to accessing the photographs, and ordering products if desired from the interactive product web page.

25. The process of claim 1, wherein the sponsor data comprises a hyperlink to a website selected by the sponsor.

26. The process of claim 1, wherein the sponsor of an event is provided with copies of all photographs for that event, whether the copies are provided on cd or other medium.

27. The process of claim 1, wherein the step of providing identifying data to event participants, sponsors, and combinations thereof, is performed by providing an electronic notification.

* * * * *